US008967501B2

(12) United States Patent
Haeberer

(10) Patent No.: US 8,967,501 B2
(45) Date of Patent: Mar. 3, 2015

(54) VALVE ARRANGEMENT FOR METERING A FLUID MEDIUM IN AN EXHAUST LINE OF AN INTERNAL COMBUSTION ENGINE

(75) Inventor: Rainer Haeberer, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 13/698,929

(22) PCT Filed: May 13, 2011

(86) PCT No.: PCT/EP2011/057793
§ 371 (c)(1),
(2), (4) Date: Nov. 19, 2012

(87) PCT Pub. No.: WO2011/147698
PCT Pub. Date: Dec. 1, 2011

(65) Prior Publication Data
US 2013/0061948 A1      Mar. 14, 2013

(30) Foreign Application Priority Data

May 26, 2010   (DE) .......................... 10 2010 029 298

(51) Int. Cl.
*F02M 61/00*   (2006.01)
*F01N 3/20*   (2006.01)

(52) U.S. Cl.
CPC ........... *F01N 3/2066* (2013.01); *F01N 2610/02* (2013.01); *F01N 2610/03* (2013.01); *F01N 2610/1453* (2013.01); *Y02T 10/24* (2013.01)
USPC ......... 239/533.12; 239/596; 239/600; 60/286

(58) Field of Classification Search
CPC .......... F01N 2610/1453; F01N 3/2066; F01N 2610/02; F01N 2610/03; F16K 51/00
USPC .............. 239/533.12, 596, 600; 60/322, 286, 60/303, 324, 295; 181/237, 254, 258; 261/78.2
See application file for complete search history.

(56) References Cited

U.S. PATENT DOCUMENTS 3,695,286 A    10/1972   Uerlichs et al.
4,621,772 A  * 11/1986   Blythe et al. ............... 239/585.4
(Continued)

FOREIGN PATENT DOCUMENTS

DE    102007031817    1/2009
DE    102008055190    7/2009
(Continued)

OTHER PUBLICATIONS

International Search Report for Application No. PCT/EP2011/057793 dated Aug. 1, 2012 (English Translation and Original, 6 pages).

*Primary Examiner* — John K Fristoe, Jr.
*Assistant Examiner* — David Colon Morales
(74) *Attorney, Agent, or Firm* — Michael Best & Friedrich LLP

(57) ABSTRACT

The invention relates to a valve arrangement (2) for metering a fluid medium into an exhaust line (22), comprising a valve seat (10) which acts together with a closing body (12) and in which a valve passage (14) is implemented, and a perforated disc (6) that is disposed downstream of the valve seat, closes off the valve passage, and has at least one axial hole (8) in the area of the valve passage through which the fluid medium can be injected into the exhaust line (22). The valve arrangement further comprises a connecting flange (16) for connecting the valve arrangement (2) to the exhaust line (22) in a fluid-tight manner, wherein the perforated disc (6) extends from the valve passage to the connecting flange and is implemented such that said perforated disc seals the connecting flange against the exhaust line in a fluid-tight manner in the installed state. A separate seal is thus no longer required, because the perforated disc performs the sealing function.

11 Claims, 1 Drawing Sheet

(56) References Cited

U.S. PATENT DOCUMENTS

| | | | |
|---|---|---|---|
| 4,907,748 A * | 3/1990 | Gardner et al. | 239/584 |
| 4,932,374 A * | 6/1990 | Klomp et al. | 123/298 |
| 4,934,653 A * | 6/1990 | Grieb et al. | 251/118 |
| 5,381,965 A * | 1/1995 | Chabon et al. | 239/585.1 |
| 5,437,413 A * | 8/1995 | Shen et al. | 239/424.5 |
| 5,718,387 A * | 2/1998 | Awarzamani et al. | 239/585.1 |
| 5,746,376 A * | 5/1998 | Romann et al. | 239/585.4 |
| 5,826,804 A * | 10/1998 | Reiter et al. | 239/585.1 |
| 5,862,991 A * | 1/1999 | Willke et al. | 239/397.5 |
| 5,911,366 A * | 6/1999 | Maier et al. | 239/553.3 |
| 5,967,419 A * | 10/1999 | Yamaguchi et al. | 239/397.5 |
| 6,168,099 B1 * | 1/2001 | Hopf et al. | 239/596 |
| 6,170,763 B1 * | 1/2001 | Fuchs et al. | 239/533.12 |
| 6,224,002 B1 * | 5/2001 | Reiter | 239/585.3 |
| 6,230,992 B1 * | 5/2001 | Arndt et al. | 239/585.1 |
| 6,324,832 B1 | 12/2001 | Ivanov et al. | |
| 6,678,955 B2 * | 1/2004 | Takeshita et al. | 29/890.142 |
| 6,679,435 B1 * | 1/2004 | Noller et al. | 239/5 |
| 6,685,112 B1 * | 2/2004 | Hornby et al. | 239/585.1 |
| 6,869,032 B2 * | 3/2005 | Maier et al. | 239/533.13 |
| 6,869,033 B2 * | 3/2005 | Ricco et al. | 239/585.1 |
| 6,991,188 B2 * | 1/2006 | Kobayashi et al. | 239/596 |
| 7,422,160 B2 * | 9/2008 | Dallmeyer | 239/5 |
| 7,603,849 B2 * | 10/2009 | Hanitzsch et al. | 60/286 |
| 7,637,442 B2 | 12/2009 | Aoki et al. | |
| 2003/0127547 A1 * | 7/2003 | Nowak | 239/596 |
| 2005/0040259 A1 * | 2/2005 | Dallmeyer et al. | 239/533.12 |
| 2006/0101811 A1 * | 5/2006 | Linna et al. | 60/286 |
| 2007/0033927 A1 * | 2/2007 | Homby et al. | 60/286 |
| 2008/0148717 A1 * | 6/2008 | Ohshima et al. | 60/295 |
| 2008/0236147 A1 * | 10/2008 | Van Vuuren et al. | 60/295 |
| 2009/0200402 A1 * | 8/2009 | Gesk et al. | 239/533.12 |
| 2009/0241906 A1 * | 10/2009 | Osbat et al. | 123/470 |
| 2009/0282814 A1 * | 11/2009 | Stein | 60/286 |

FOREIGN PATENT DOCUMENTS

| | | |
|---|---|---|
| WO | 2009033963 | 3/2009 |
| WO | 2010149411 | 12/2010 |

* cited by examiner

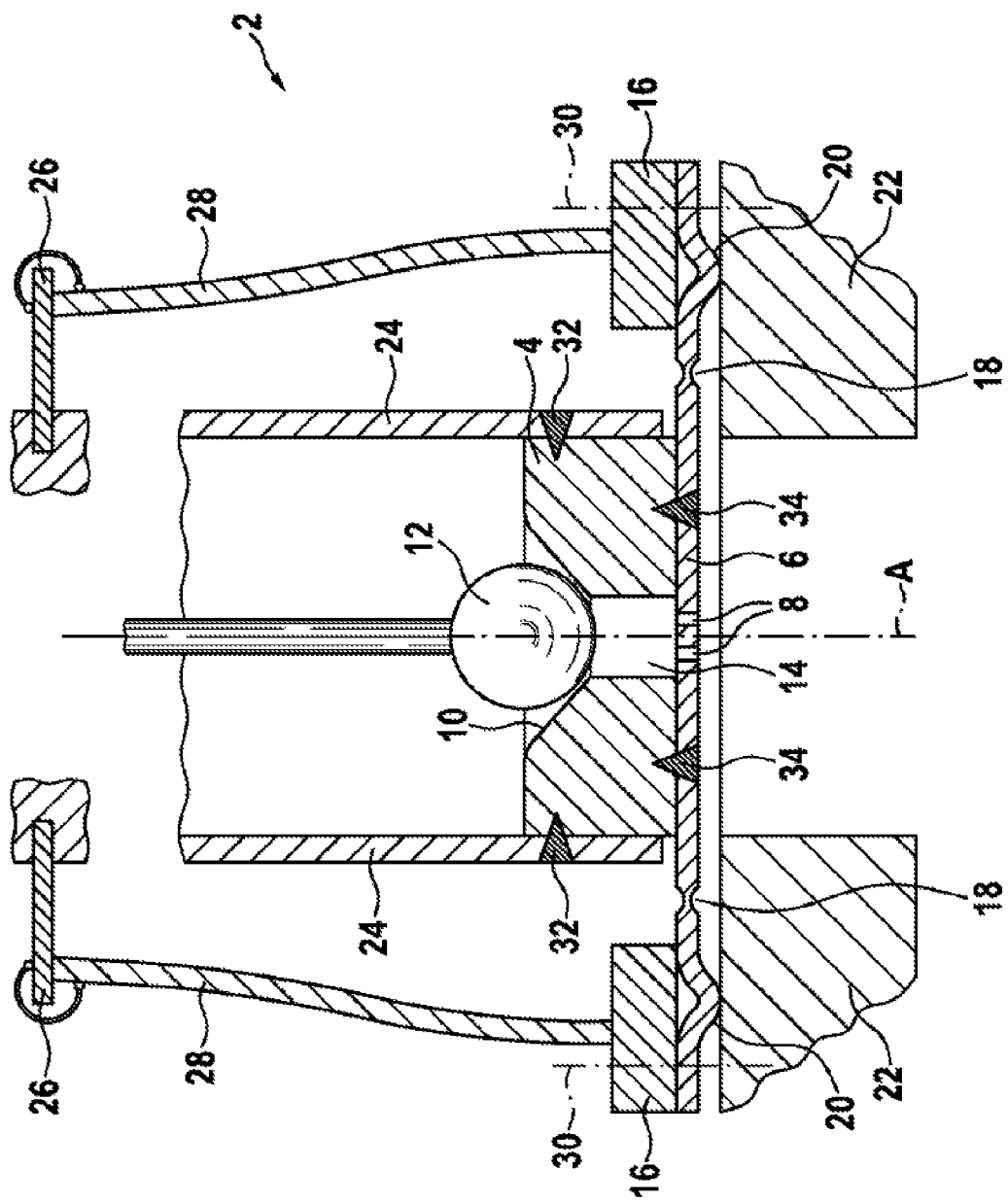

VALVE ARRANGEMENT FOR METERING A FLUID MEDIUM IN AN EXHAUST LINE OF AN INTERNAL COMBUSTION ENGINE

BACKGROUND OF THE INVENTION

The invention relates to a valve arrangement for dosing a fluid medium, in particular an aqueous urea solution, into an exhaust line of an internal combustion engine, in particular of a diesel engine.

The exhaust gas of modern internal combustion engines comprises numerous constituents which are harmful to the environment, in particular nitrogen oxides (NOx). For the reduction of the nitrogen oxides in the exhaust gas, the exhaust gas often undergoes aftertreatment in the exhaust line of the internal combustion engine. One method used for the aftertreatment of the exhaust gas is the SCR (selective catalytic reduction) method in which a reducing agent, generally an aqueous urea solution, is injected into the exhaust line, as a result of which the nitrogen oxides (NOx) are reduced to form nitrogen (N2) and water vapor (H2O). It is thereby possible to reduce the emission of nitrogen oxides in the exhaust gas of internal combustion engines by approximately 90%. Here, aqueous urea solution, for example an aqueous solution, known as AdBlue, of 32.5 percent high-purity urea in demineralized water, is an environmentally friendly chemical product for exhaust-gas purification.

The reducing agent for the aftertreatment of the exhaust gas is conventionally stored in a tank and introduced into the exhaust line of the internal combustion engine under pressure via a dosing valve. Such a dosing valve generally comprises a perforated disk via which the pressurized reducing agent is injected into the exhaust-gas stream.

Such a valve is known from WO 2009/033963, which describes a valve arrangement for dosing a fluid, in particular pollutant-reducing medium, into the exhaust line of a motor vehicle exhaust system. The valve arrangement comprises a fluid inlet, an outlet region and a movably mounted closing body which, in order to close off the outlet region, interacts with a valve seat formed on a holding body, wherein when the outlet region is open, the medium can flow from the fluid inlet to the outlet region. Also situated in the outlet region is a spray hole disk which is fastened to the holding body. The valve is inserted into an adapter provided on the exhaust line and is sealed off by means of a corresponding O-ring seal.

Valves known from the prior art which have a spray hole disk through which a reducing agent can be supplied to an exhaust line of an internal combustion engine are complex to produce and assemble. For example, it has hitherto been necessary to provide separate sealing elements between the valve and the exhaust line. Furthermore, in known valves, large amounts of heat are introduced from the exhaust gas into the valve.

SUMMARY OF THE INVENTION

The present invention is therefore based on the object of providing a valve arrangement for introducing a fluid medium into an exhaust line, which valve arrangement is simpler to produce and assemble than known valves but nevertheless ensures a reliable fluid-tight connection between the valve and exhaust line.

The object of the invention is achieved by means of a valve arrangement for dosing a fluid medium into an exhaust line.

A valve arrangement according to the invention for dosing a fluid medium into an exhaust line comprises a valve seat which interacts with a closing body and in which a valve passage is formed, and a perforated disk which is arranged downstream of the valve seat and which closes off the valve passage and which, in the region of the valve passage, has at least one axial hole through which the fluid medium can be injected into the exhaust line. Furthermore, the valve arrangement comprises a connecting flange for the fluid-tight connection of the valve arrangement to the exhaust line, wherein the perforated disk extends from the valve passage to the connecting flange and is designed such that, in the installed state, it seals off the connecting flange in a fluid-tight manner with respect to the exhaust line. It is thus possible to dispense with a separate seal, because the perforated disk performs the sealing function.

Here, the fluid medium may be composed for example of an aqueous urea solution which is used for the aftertreatment of exhaust gases. Use is for example often made of a solution, known as AdBlue, with a 32.5 percent fraction of high-purity urea in demineralized water.

In relation to already known valve arrangements for dosing a fluid medium into an exhaust line, the advantage may furthermore be attained that the perforated disk arranged downstream of the valve seat serves not only to provide fluid-tight sealing of the valve with respect to the exhaust line but rather additionally fixes the valve arrangement in the radial direction. The perforated disk may for example be fastenable to a holding body which has the valve passage, and may thereby realize the radial fixing in that it extends from the valve passage to the connecting flange and, there, in the installed state, is compressed firmly between the connecting flange and the exhaust line. The perforated disk constitutes a connection between the exhaust line and the valve arrangement and, as a result of the described fastening, prevents a radial movement of the valve arrangement relative to the exhaust line. The fastening between the connecting flange and the exhaust line may be realized for example by means of an axial compression, implemented for example by means of a screw connection.

In one embodiment, the perforated disk may be deformable and thus, in the installed state, adapt itself to the shape of the exhaust line or of the connecting flange under the action of pressure forces. The deformation of the perforated disk in the installed state may be substantially plastic. The deformation of the perforated disk in the installed state may however also be substantially elastic, such that the perforated disk assumes its original shape again after being dismounted.

The switching of the valve arrangement generates noises and vibrations which can be transmitted from the valve arrangement to the exhaust line. If a highly deformable perforated disk is used, the advantage is attained that no impulses or only small impulses can be transmitted from the perforated disk to the exhaust line because the flexible perforated disk dampens an impulse transmission. This contributes significantly to better suppression of switching noises and vibrations caused by the valve arrangement.

In one embodiment, the perforated disk is in the form of a thin plate with a wall thickness which is less than 0.3 mm and which is in particular in a range from 0.1 mm to 0.3 mm.

Here, a small wall thickness of the perforated disk ensures good deformability and simultaneously ensures that there is only a small heat flow from the exhaust line to the valve during operation. As a result, the valve arrangement is less intensely heated during operation.

In a further refinement of the invention, the perforated disk may be produced from a metallic material, which in particular exhibits a high degree of deformability and low thermal conductivity while having a small wall thickness. It has been found that perforated disks composed of metal are highly suitable.

Furthermore, in one refinement of the invention, the perforated disk may have at least one constriction. The wall thickness is smaller in the region of a constriction than in the adjacent regions of the perforated disk. Here, such a local constriction in the perforated disk may for example be of annular form, surrounding the valve passage. At least partially radially running constrictions are also conceivable if appropriate.

Such a constriction reduces the heat flow from the exhaust line into the valve arrangement and thus constitutes an additional heat retarder. Furthermore, the material has a lower bending stiffness at the points of reduced wall thickness, and the perforated disk is thus provided with an increased degree of deformability.

A further embodiment encompasses a valve arrangement in which the perforated disk has, in a region which in the installed state is situated between the perforated disk and the connecting flange, at least one bead which in the installed state produces a fluid-tight connection between the connecting flange and the exhaust line. The bead advantageously runs around the valve passage, for example in an annular manner.

Axial pressing of the connecting flange against the exhaust line, for example by means of a screw connection, results in a deformation of the flexurally resilient material at the location of the bead. In this way, the region between the connecting flange and the exhaust line is sealed off in a fluid-tight manner and an escape of the fluid medium or of the exhaust gas from the valve arrangement or the exhaust line into the environment is prevented.

The stamping of such a bead into the perforated disk yields a reliably sealing structure and has the advantage that there is no need for an additional sealing element, such as for example a plastic sealing ring, between the valve arrangement and the exhaust line. There are advantageously no constrictions in the wall thickness of the perforated disk in the region of the bead.

Furthermore, as a result of the bead which is stamped into the perforated disk, the introduction of heat from the exhaust line into the connecting flange is minimized, because the connection between the exhaust line and the connecting flange takes place via the perforated disk and there is a relatively small contact surface between the components in the region of the bead. The contact surface may in particular be formed approximately in the manner of a groove and form a seal in the manner of a "Metalloseal".

Furthermore, a further embodiment of the valve arrangement comprises a static holding body which interacts with the closing body and on which the valve seat is formed. The perforated disk may then be formed on, in particular welded to, the static holding body.

As a result of the fastening of the perforated disk to the static holding body, the valve arrangement is fixed to the exhaust line because the perforated disk is firstly compressed between the connecting flange and the exhaust line and is secondly fastened to the static holding body.

Furthermore, the valve arrangement may comprise a housing which at least partially surrounds the valve seat and the closing body and is fixedly connected to the valve seat, wherein the connecting flange is fastened via a preferably U-shaped spring washer to the housing in such a way that the valve arrangement, in the installed state, is fixed axially on the exhaust line.

In addition to the described fixing of the valve by means of the perforated disk, the valve arrangement may be fixedly clamped in the axial direction by means of the housing which is connected to the connecting flange. This has the advantage that, as a result of a further clamping of the valve arrangement, the axial and radial fixing of the valve to the exhaust line are separated from one another.

The axial fixing of the valve then need not be realized exclusively by means of the perforated disk and/or the connecting flange but rather may additionally take place at an axial distance from the connecting flange by means of a second clamping of the valve to the housing by means of the spring washer. Since the perforated disk is deformable in the axial direction owing to its small wall thickness, it is expedient for said connection not to have to impart any fixed clamping of the valve arrangement to the exhaust line in the axial direction. Furthermore, as a result of the flexibility of the perforated disk, static overdeterminacy of the valve with regard to the second clamping, which could yield inadmissible deformation of the valve arrangement, is avoided. The perforated disk is deformable only in the axial direction. No deformation of the perforated disk can take place in the radial direction, as a result of which the valve is fixed radially on the exhaust line.

A further embodiment comprises at least one web which runs in the axial direction and which connects the connecting flange and the spring washer.

The web and/or the spring washer may be of elastic form in order to as far as possible prevent impulse transmission from the valve to the exhaust line.

A suppression of the impulse transmission from the valve to the exhaust line firstly prevents a generation of noise in the exhaust line, and secondly, loading of the exhaust line by vibrations caused by the switching of the valve is prevented.

Furthermore, the web may be provided with a plurality of openings which run in the radial direction. The openings advantageously have a diameter of 2-4 mm and are arranged in an alternating fashion or at irregular intervals to one another in the web.

By means of a web which is provided with openings or which is perforated, the transmission of heat from the web to the spring washer and thus to the housing is reduced. Furthermore, by means of such a web, the noise emission therefrom is reduced. Impulses are generated by the switching of the valve, which impulses are transmitted via the web. In the case of a web which is provided with openings, the propagation of the sound waves in the web is retarded, because said sound waves must propagate around the openings and are thus attenuated.

By means of a perforated web, it is also achieved that liquid, in particular water, which can ingress into the valve arrangement from the environment can be discharged via the openings. Since the liquid usually ingresses into the valve arrangement from above, said liquid collects between the housing and the web. In the case of a web which is provided with openings, liquid which has ingressed into the valve arrangement can simply escape again, and material damage caused by the liquid, for example rust, is prevented.

The invention will be explained in more detail below on the basis of an exemplary embodiment and with reference to the appended FIGURE.

BRIEF DESCRIPTION OF THE DRAWING

The FIGURE shows a schematic illustration of a valve arrangement for dosing a fluid medium into an exhaust line according to an exemplary embodiment of the invention.

DETAILED DESCRIPTION

The valve arrangement 2 shown in the FIGURE for dosing a fluid medium into an exhaust line 22 has a fluid inlet region and a fluid outlet region which, in the installed state of the valve arrangement 2, is adjacent to the exhaust line 22. In the fluid outlet region there is provided a holding body 4 which forms a valve seat 10 and a valve passage 14 formed around a valve axis A. The valve seat 10 is arranged in the valve arrangement 2 in such a way as to interact with a closing body 12 which is mounted so as to be movable in the axial direction and which, by means of an axial movement, can close or open the valve passage 14.

The valve arrangement 2 furthermore comprises a housing 24 which surrounds the holding body 4 and the closing body 12. The housing 24 is advantageously fixedly connected to the holding body 4, in particular by welding 32, as indicated in the FIGURE by a radially encircling welded connection 32.

Here, the closing body 12 is preferably of spherical form at an end which interacts with the valve seat 10, said closing body being guided in an axially movable manner in the valve housing 24 by means of an elongate guide body. The guide body may be supported on the valve housing 24 via a spring (not shown).

At the downstream end of the valve passage 14 there is arranged a perforated disk 6. In the perforated disk 6 there is arranged at least one hole 8 which runs in the axial direction and through which the fluid medium can be injected into the exhaust line 22. The perforated disk 6 is attached to the holding body 4. As indicated in FIG. 1, the perforated disk 6 may be welded to the holding body 4, for example by means of a welded connection 34, which runs around the valve passage 14, on that face end of the holding body 4 which faces toward the exhaust line 22.

It is preferable, in order to achieve a fine atomization of the fluid medium as it is injected into the exhaust line 22, for a multiplicity of axial holes 8 to be arranged in the perforated disk 6 at least in a region which closes off the valve passage 14 in the installed state.

The valve arrangement 2 illustrated in the FIGURE furthermore comprises a connecting flange 16 which serves for the fastening of the valve arrangement 2 to an exhaust line 22 (for example to an adapter formed on the exhaust line) and by means of which a connection of the valve arrangement 2 to the exhaust line 22 is permitted. The connecting flange annularly surrounds the valve housing 24 but is not fastened directly to the valve housing 24.

The perforated disk 6 is widened in the radial direction and extends from the valve passage to the connecting flange 16. Here, the perforated disk 6 forms a seal between the connecting flange 16 and the exhaust line 22 by virtue of the perforated disk 6 being compressed between the connecting flange 16 and the exhaust line 22 in the axial direction. Such compression may be realized for example by means of a screw connection 30. As a result of the arrangement of the perforated disk at the region which extends from the valve passage 14 to the connecting flange 16, it is possible to dispense with an additional sealing element, such as for example a plastic sealing ring, between the connecting flange 16 and the exhaust line 22.

Furthermore, the valve arrangement 2 is fixed radially as a result of the fastening of the perforated disk 6 to the static holding body 4 and the clamping of the perforated disk 6 between the connecting flange 16 and the exhaust line 22.

The perforated disk 6 may be composed of a deformable material, for example a flexible metal, and thus be either elastically or plastically deformable in the installed state. Here, the perforated disk 6 is deformable primarily in the axial direction. The perforated disk 6 does not deform, or deforms only minimally, in the radial direction, and thus contributes to good radial fixing of the valve arrangement 2 to the exhaust line 22.

The valve arrangement 2 furthermore comprises a web 28 which runs in the axial direction, which is fastened to the connecting flange 16 and which is aligned parallel to the valve housing 24. The web 28 is connected to the valve housing 24 via a spring washer 26 which is supported on the valve housing 24. The web 28 and spring washer 26 serve for supporting the connecting flange 16 on the valve housing 24 in the axial direction and thus for the axial fixing of the valve arrangement 2. As indicated in the FIGURE, the abutment region of the spring washer 26 against the housing 24 is situated preferably in the vicinity of the fluid inlet region of the arrangement 2.

It is also conceivable to dispense with the axial web 28 and to connect, in particular weld, the connecting flange 16 directly to the valve housing 24.

The valve arrangement 2 is fixed in the axial direction in two respects: firstly, the valve arrangement 2 is fixed axially by means of the connecting flange 16, by means of the web 28 and the spring washer 26 at the fluid inlet region. Secondly, the valve arrangement 2 is fixed in the axial direction by means of the connecting flange 16, the perforated disk 6 and the holding body 4. It is thus expedient for the axial fastening of the valve arrangement 2 by means of the perforated disk 6 to be configured to have the greatest possible degree of mobility in order to avoid static overdetermination of the valve arrangement 2, and resulting stresses. The movable axial fixing of the valve arrangement 2 may be attained through the use of a perforated disk 6 which exhibits good deformability.

Here, the web 28 and the spring washer 26 are advantageously composed of an elastic material, as a result of which impulse transmission from the valve to the exhaust line 22 is prevented.

A flexible design of the connection between the valve arrangement 2 and the exhaust line 22 offers the advantage that the noises and vibrations generated by the valve arrangement 2 as a result of the switching of the valve arrangement cannot be transmitted to the exhaust line 22, and thus the noises during the injection of a fluid medium into the exhaust line 22 can be minimized. The impulses generated by the valve arrangement are substantially absorbed by the flexible spring washer 26 and the flexible web 28 and not transmitted to the exhaust line 22.

The web 28 may be provided, or perforated, with a plurality of openings running in the radial direction. The openings advantageously have a diameter of 2-4 mm and are arranged offset or at irregular intervals to one another in the web 28. By means of a web which is provided with openings, the transmission of heat from the web 28 to the spring washer 26 and thus to the valve housing 24 is reduced. Furthermore, a perforated web 28 offers the advantage that the noise emission from the web 28 is reduced. Impulses are generated by the switching of the valve, which impulses are transmitted via the web 28 to the exhaust line 22. In the case of a perforated web 28, the propagation of the sound waves in the web 28 is retarded, because said sound waves must propagate around the openings and are thus attenuated.

Furthermore, the holes arranged in the web yield a better outflow of liquid, in particular water, which can enter into the valve arrangement from the surroundings. Since liquid usually enters the valve arrangement from the top, it collects between the housing and the web. In the case of a web provided with openings, liquid which has ingressed into the valve arrangement can simply flow out again, and material damage resulting from the liquid, for example rust, is prevented.

The perforated disk 6 has at least one constriction 18. The perforated disk 6 has a smaller wall thickness in the region of the constriction than in the adjoining regions of the perforated disk 6. A multiplicity of constrictions 18 is preferably formed in the perforated disk 6, wherein said constrictions may for example run radially or in the circumferential direction. The constriction 18 effects a reduction in the bending stiffness of the perforated disk 6 with regard to forces acting in the axial direction. The constriction 18 furthermore has the function of a heat retarder, and reduces the heat flow from the exhaust line 22 into the valve arrangement 2.

The perforated disk 6 is furthermore provided with a bead 20 which is arranged in a press-on region which, in the installed state, is situated between the connecting flange 16 and the exhaust line 22. The bead 20 may run in the perforated disk 6 for example continuously or else in segments in the circumferential direction.

In the installed state, the bead 20 is compressed axially, and thereby deformed, between the connecting flange 16 and the exhaust line. As a result of the deformation of the perforated disk 6 in the region of the bead 20, said perforated disk adapts optimally to the adjoining surfaces of the connecting flange 16 and of the exhaust line 22, as a result of which a fluid-tight connection is produced between the exhaust line 22 and the valve arrangement 2. Such a seal is also known as a Metallo-seal.

As a result of the bead 20 which is stamped into the perforated disk, the introduction of heat from the exhaust line 22 into the connecting flange 16 is minimized, because the connection between the exhaust line 22 and the connecting flange 16 takes place via the perforated disk and there is a relatively small contact surface between the components in the region of the bead 20. The contact surface between the bead and the connecting flange 16 on one side and the exhaust line 22 on the other side of the perforated disk 6 may preferably be of groove-like form.

The perforated disk 6 has a small wall thickness which is preferably less than 0.3 mm and which is in particular in a range from 0.1 mm to 0.3 mm. As a result of a small wall thickness of the perforated disk 6, the bending stiffness of the perforated disk 6 is reduced, and the latter is more easily deformable.

In order to ensure fluid-tight sealing of the valve with respect to the exhaust line 22, it is preferable for no holes 8 to be formed in a region of the perforated disk 6 which, in the installed state, is situated between the connecting flange 16 and the exhaust line 22.

The invention claimed is:

1. A valve arrangement (2) for dosing a fluid medium into an exhaust line (22) of an internal combustion engine, the valve arrangement comprising:

a valve seat (10) which interacts with a closing body (12) and in which a valve passage (14) is formed;

a perforated disk (6) which is arranged downstream of the valve seat (10) and which closes off the valve passage (14) and which, in a region of the valve passage (14), has at least one axial hole (8) through which the fluid medium can be injected into the exhaust line (22);

a connecting flange (16) for fluid-tight connection of the valve arrangement (2) to the exhaust line (22); and a housing (24) which at least partially surrounds the valve seat (10) and the closing body (12) and is fixedly connected to the valve seat (10), wherein the perforated disk (6) extends from the valve passage (14) to the connecting flange (16) and is designed such that, in an installed state, the perforated disk seals off the connecting flange (16) in a fluid-tight manner with respect to the exhaust line (22);

wherein the perforated disk (6) is attached to a static holding body (4) on which the valve seat (10) is formed; and wherein the connecting flange (16) is fastened via a spring washer (26) to the housing (24) in such a way that the valve arrangement (2), in the installed state, is fixed axially on the exhaust line (22).

2. The valve arrangement as claimed in claim 1, wherein the perforated disk (6) is deformable.

3. The valve arrangement as claimed in claim 1, wherein the perforated disk (6) is formed from a metallic material.

4. The valve arrangement as claimed in claim 1, wherein the perforated disk (6) has at least one constriction (18).

5. The valve arrangement as claimed in claim 1, wherein the perforated disk (6) has, in a region which in the installed state is situated between the perforated disk (6) and the connecting flange (16), at least one bead (20) which in the installed state produces a fluid-tight connection between the connecting flange (16) and the exhaust line (22).

6. The valve arrangement as claimed in claim 1, wherein the perforated disk (6) is welded to the static holding body (4) on which the valve seat (10) is formed.

7. The valve arrangement as claimed in claim 1, wherein the spring washer (26) is U-shaped.

8. The valve arrangement as claimed in claim 1, wherein the perforated disk (6) has a wall thickness of less than 0.3 mm.

9. The valve arrangement as claimed in claim 8, wherein the wall thickness is in a range from 0.1 mm to 0.3 mm.

10. The valve arrangement as claimed in claim 1, also having at least one web (28) which runs in an axial direction and which connects the connecting flange (16) and the spring washer (26).

11. The valve arrangement as claimed in claim 10, wherein at least one of the web (28) and the spring washer (26) is elastic in order to prevent impulse transmission from the valve to the exhaust line (22).

* * * * *